(12) United States Patent
Kawaguchi

(10) Patent No.: US 7,420,006 B2
(45) Date of Patent: Sep. 2, 2008

(54) INK SET

(75) Inventor: Takashi Kawaguchi, Aichi-ken (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/645,798

(22) Filed: Aug. 22, 2003

(65) Prior Publication Data

US 2004/0039081 A1      Feb. 26, 2004

(30) Foreign Application Priority Data

Aug. 26, 2002    (JP) .............................. 2002-244677

(51) Int. Cl.
  *C09D 11/00*      (2006.01)
(52) U.S. Cl. ...................... 523/160; 523/161
(58) Field of Classification Search ................ 523/160, 523/161
  See application file for complete search history.

(56) References Cited

U.S. PATENT DOCUMENTS

| | | | | |
|---|---|---|---|---|
| 5,772,746 A | * | 6/1998 | Sawada et al. | 106/31.86 |
| 5,900,899 A | * | 5/1999 | Ichizawa et al. | 347/100 |
| 5,954,866 A | * | 9/1999 | Ohta et al. | 106/31.89 |
| 5,990,227 A | * | 11/1999 | Takizawa et al. | 524/517 |
| 6,136,890 A | * | 10/2000 | Carlson et al. | 523/160 |
| 6,247,808 B1 | * | 6/2001 | Ma et al. | 347/100 |
| 6,540,329 B1 | * | 4/2003 | Kaneko et al. | 347/43 |
| 6,670,409 B2 | * | 12/2003 | Yatake | 523/160 |
| 6,695,443 B2 | * | 2/2004 | Arita et al. | 347/100 |
| 6,706,104 B2 | * | 3/2004 | Takuhara et al. | 106/31.6 |
| 6,716,912 B2 | * | 4/2004 | Freeman et al. | 524/824 |

FOREIGN PATENT DOCUMENTS

| | | |
|---|---|---|
| JP | A-8-72393 | 3/1996 |
| JP | A-8-283636 | 10/1996 |
| JP | A-11-343440 | 12/1999 |
| JP | A-2000-319569 | 11/2000 |
| JP | A-2001-262022 | 9/2001 |
| JP | A-2001-294788 | 10/2001 |
| JP | A-2001-328347 | 11/2001 |
| JP | A-2001-348518 | 12/2001 |

* cited by examiner

*Primary Examiner*—Edward J Cain
(74) *Attorney, Agent, or Firm*—Oliff & Berridge, PLC

(57) ABSTRACT

An ink set comprises a black ink which contains a black pigment, resin particles having carboxyl group, a first pH-adjusting agent, a water-soluble organic solvent, and water, and a color ink which contains a coloring pigment, resin particles, a second pH-adjusting agent, a water-soluble organic solvent, and water. The pH of the black ink is not less than 7.8, and the pH of the color ink is not more than 4.5. Any bleeding of the black ink is not caused even when an image is formed on a cloth or the like with the ink set. Even when the cloth is washed, then the ink is not lost from the image formation objective, and the initial image density is maintained.

8 Claims, 1 Drawing Sheet

INK SET

BACKGROUND OF THE INVENTION

1. Field of the Invention

The present invention relates to an ink set which includes a black ink and a color ink other than the black ink. In particular, the present invention relates to an ink set which is usable for an image-forming apparatus based on the ink-jet system.

2. Description of the Related Art

Those which are based on the use of dyes as color materials are widely used as inks to be employed for image-forming apparatuses based on the ink-jet system. However, the ink, which is based on the use of the dye, is generally inferior in water resistance. For this reason, when an image is formed, for example, on a cloth or fabric other than paper, an ink, which is based on the use of a pigment as a color material, has been hitherto used. However, when an image is formed on a cloth or the like with inks based on the use of pigments (hereinafter referred to as "pigment-based inks", if necessary), any extreme bleeding occurs at the boundary between the black ink and the color ink other than the black ink. In order to avoid the bleeding as described above, it is also conceived that the cloth is pretreated, for example, with cellulose. However, the pretreatment requires a large amount of energy. Further, the cloth, on which an image can be formed with the pigment-based ink, is restricted.

In order to suppress the bleeding caused by pigment-based inks, for example, Japanese Patent Application Laid-open No. 2001-294788 suggests a technique in which a coagulating agent, which coagulates any one of components of a black ink, is contained in color inks of cyan, magenta, and yellow to coagulate the component contained in the black ink so that the movement of carbon black as a pigment is suppressed.

It is postulated that the bleeding of the black ink can be suppressed to some extent when the suggested technique is adopted. However, the image formation objective, which is assumed by the suggested technique, is principally paper. In the case of the cloth or the like in which gaps between fibers are large, it is impossible to suppress the bleeding equivalently to the case of the paper. Further, it is assumed that the cloth or the like is washed or laundered. However, in the case of the suggested technique, the ink is lost by the washing, and the density of the image is thinned in some cases.

SUMMARY OF THE INVENTION

The present invention has been made in consideration of the problems involved in the conventional technique as described above, an object of which is to provide an ink set in which no bleeding is caused by a pigment-based black ink even when an image is formed on a cloth or the like.

Another object of the present invention is to provide an ink set with which an ink is not lost from an image formation objective and an initial image density is maintained even when the image formation objective such as a cloth is washed.

According to the present invention, there is provided a color ink set comprising a black ink and a color ink which is different from the black ink; wherein the black ink contains a black pigment, resin particles having carboxyl group, a first pH-adjusting agent, a water-soluble organic solvent, and water; the color ink contains a coloring pigment, resin particles, a second pH-adjusting agent, a water-soluble organic solvent, and water; and pH of the black ink is not less than 7.8, and pH of the color ink is not more than 4.5. The pH of the black ink may be not less than 8.7. The pH of the color ink may be not more than 2.7.

In the present invention, in view of the prevention of the loss of the ink from the image formation objective even when washing or the like is performed, the resin particles having carboxyl group may be polyester resin particles, polyurethane resin particles, or polyolefin resin particles.

In view of the prevention of the clog-up caused by the deposition, the first pH-adjusting agent is preferably organic amine, and the second pH-adjusting agent is preferably organic acid. The resin particles contained in the color ink may be acrylic resin particles in view of stability in acidic pH area. The acrylic resin particles may be resin particles containing a main component of polyacrylic acid or polyacrylic acid ester.

The ink set of the present invention may be in a form of ink cartridge. The ink cartridge may be either a cartridge which can be detachably attached to a recording head, or a cartridge which may be detachably installed to a main ink-jet printer body.

DESCRIPTION OF THE PREFERRED EMBODIMENTS

Figure 1:
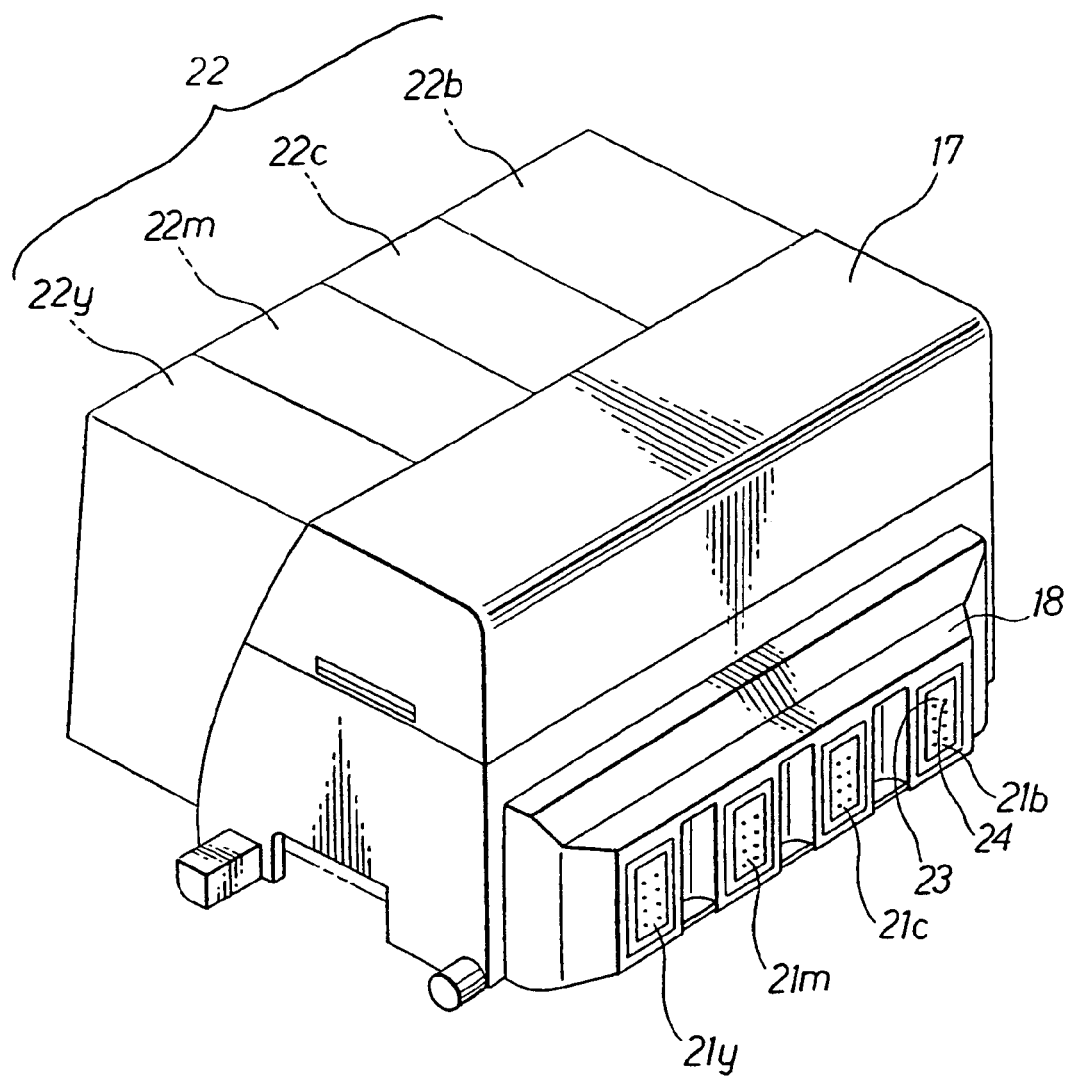
FIG. 1 shows an ink jet head which ejects four color inks and is provided with a color ink cartridge which contains the ink set in accordance with the invention.

As a result of repeated and diligent investigations performed by the present inventors in order to make it possible that the bleeding of the pigment-based black ink is avoided and the ink is not lost from the image formation objective even when the image formation objective is washed, it has been found out that the resin particles having the carboxyl group have such characteristics that they are stably dispersed in the solvent in the alkaline area while they are coagulated in the acidic area. Thus, the present invention has been completed. That is, the characteristic feature of the present invention is as follows. The resin particles are used as the binding resin for the black ink, and pH of the black ink is alkaline while pH of the color ink is acidic. Accordingly, the binding resin for the black ink is coagulated at the contact portion between the black ink and the color ink. The black pigment is incorporated into the interstices between the binding resin particles in accordance with the coagulation of the binding resin. Thus, the bleeding of the black ink is effectively avoided.

Any specified mechanism, in which the resin particles having the carboxyl group are stably dispersed in the solvent in the alkaline area while they are coagulated in the acidic area, has not been elucidated sufficiently. However, at present, it is postulated that the carboxyl group in the resin particles is ionized in the alkaline area to form —COO⁻ which effects the surface-activating action, while the ionization of the carboxyl group is decreased in the acidic area and the resin particles are consequently coagulated. According to experiments performed by the present inventors, it is necessary that pH is not less than 7.8 in order to stably disperse the resin particles in the black ink, while it is necessary that pH is not more than 4.5 in order to coagulate the resin particles.

When the black pigment is incorporated into the interstices between the resin particles by means of the coagulation of the resin particles as described above, the securing strength of the black pigment is enhanced with respect to the image formation objective as compared with a case in which the black pigment is coagulated with a coagulating agent. Accordingly, no separation occurs even when any strong external force is exerted by the washing or the like.

The resin particles having the carboxyl group, which are usable in the present invention, are not especially limited. It is possible to use conventionally known resin particles. However, in view of, for example, the washing durability, it is preferable to use resin particles composed of at least one of polyester resin, polyurethane resin, and polyolefin resin. Among them, it is especially preferable to use resin particles composed of polyester resin.

When the resin particles having the carboxyl group are composed of the polyester resin, the resin particles can be principally obtained by means of condensation polymerization of polyvalent carboxylic acid and polyvalent alcohol. The polyvalent carboxylic acid to be used for the polyester resin includes, for example, aromatic polyvalent carboxylic acid such as phthalic acid, isophthalic acid, terephthalic acid, 1,2,4-benzenetricarboxylic acid, 2,5,7-naphthalenetricarboxylic acid, 1,2,4-naphthalenetricarboxylic acid, and pyromellitic acid; aliphatic dicarboxylic acid such as malonic acid, maleic acid, fumaric acid, succinic acid, mesaconic acid, citraconic acid, and glutaconic acid; alicyclic dicarboxylic acid such as cyclohexanedicarboxylic acid; and anhydrides and lower alkyl esters of the carboxylic acids as described above. One of the compounds as described above or two or more of the compounds as described above may be used.

The polyvalent alcohol to be used for the polyester resin may include, for example, alkylene glycols such as ethylene glycol and 1,4-butenediol; alkylene ether glycols such as diethylene glycol, triethylene glycol, dipropylene glycol, polyethylene glycol, polypropylene glycol, and polytetramethylene glycol; alicyclic polyvalent alcohols such as 1,4-cyclohexane dimethanol and hydrogenated bisphenol A; bisphenols such as bisphenol A, bisphenol F, and bisphenol S; and alkylene oxides of bisphenols. One of the compounds as described above or two or more of the compounds as described above may be used.

In order to allow the carboxyl group to exist in the polyester resin, the ratio of the carboxylic acid monomer is made to be larger than that of the alcohol monomer. Alternatively, when the alcohol monomer is used in a large amount, the reaction may be completed at a point of time at which the reaction proceeds to give an appropriate acid value.

In order to adjust the molecular weight and control the reaction, monocarboxylic acid and/or monoalcohol may be used, if necessary. The monocarboxylic acid may include, for example, benzoic acid, paraoxy benzoic acid, toluenecarboxylic acid, salicylic acid, acetic acid, propionic acid, and stearic acid. The monoalcohol may include, for example, benzyl alcohol, toluene-4-methanol, and cyclohexane methanol.

The particle size of the resin particle is not specifically limited, which may be appropriately determined depending on, for example, the size of the ink droplet and the size of the black pigment. In general, the particle size is preferably substantially equivalent to the size of the black pigment. The average particle size is preferably not more than 0.1 µm. The content of the resin particles is preferably within a range of 1 to 15% by weight with respect to the ink, for the following reason. That is, if the content of the resin particles is less than 1% by weight, it is feared that the incorporation of the black pigment, which is effected by the coagulation of resin particles, is insufficient, the bleeding is caused, and the discoloration is caused by the washing. On the other hand, if the content exceeds 15% by weight, it is feared that the viscosity of the black ink is increased, and any trouble is caused in the discharge of the ink from the ink head. More preferably, the content is within a range of 2 to 10% by weight.

Commercially available resin particles composed of the polyester resin capable of being used in the present invention include, for example, "KZA-5034S" produced by UNITIKA LTD.

It is necessary that pH of the black ink to be used in the present invention is usually in the alkaline area as described above. Specifically, it is necessary that pH is not less than 7.8. Accordingly, the first pH-adjusting agent is contained in the black ink to adjust pH of the black ink within the range as described above. The first pH-adjusting agent, which is usable herein, may include, for example, organic amines such as triethanolamine and diethanolamine; volatile compounds such as ammonia; and alkaline compounds such as NaOH. Among them, it is preferable to use the organic amine in view of the prevention of any clog-up of the nozzle which would be otherwise caused by the deposition. More preferably, pH of the black ink is not less than 8.5.

The black pigment, which is usable in the present invention, is not specifically limited. It is possible to use conventionally known ones. There are exemplified, for example, carbon blacks such as Furnace Black, Channel Black, Thermal Black, Acetylene Black, Lamp Black, and Aniline Black. Among them, it is preferable to use Furnace Black. The particle size of the black pigment is not especially limited. However, the particle size is preferably not more than 0.2 µm in view of, for example, the dispersibility. It is preferable that the content of the black pigment is within a range of 0.1 to 20% by weight with respect to the ink, for the following reason. That is, if the content of the black pigment is less than 0.1% by weight, it is feared that the coloring power is insufficient. On the contrary, if the content of the black pigment is larger than 20% by weight, it is feared that the discharge port of the ink head is clogged. More preferably, the content of the black pigment is within a range of 0.5 to 10% by weight. Commercially available carbon blacks, which are usable, include, for example, Printex 75, 80, 85, 90, 95, L, U, V (produced by Degussa); MA100, MA7, #30, #32, #33, #40, #50, #850, #900, #950, #1000, #2300 (produced by Mitsubishi Chemical Corporation); Regal 1330R, 400R, 500R, 660R, 99I; and Black Pearls 700, 800, 880, 1000, 1100 (produced by Cabot).

The water, which is usable in the present invention, is preferably those having high purities such as ion exchange water and distilled water. The water-soluble organic solvent includes, for example, glycols such as glycerol, ethylene glycol, diethylene glycol, triethylene glycol, propylene glycol, butylene glycol, and polyethylene glycol; lower alkyl alcohols such as methyl alcohol and ethyl alcohol; amides such as dimethylformamide and dimethylacetamide; ethers such as tetrahydrofuran and dioxane; and lower alkyl ethers of polyvalent alcohols such as ethylene glycol monomethyl ether and diethylene glycol methyl ether. Among them, it is preferable to use glycerol in view of the prevention of the drying and the prevention of the bleeding. It is preferable that the content of the water-soluble organic solvent is within a range of 5 to 60% by weight with respect to the ink, for the following reason. That is, if the content is less than 5% by weight, the ink tends to be dried. On the contrary, if the content is larger than 60% by weight, then the viscosity of the ink is increased, and a large amount energy is required to discharge the ink from the ink head. More preferably, the content is within a range of 10 to 50% by weight.

Next, an explanation will be made about the color ink to be used in the present invention. At first, the coloring pigment to be contained in the color ink is as follows. The yellow coloring pigment includes, for example, azo pigments such as C. I. Pigment Yellow 1, C. I. Pigment Yellow 5, C. I. Pigment Yellow 12, C. I. Pigment Yellow 15, C. I. Pigment Yellow 17, C. I. Pigment Yellow 180, C. I. Pigment Yellow 74, C. I. Pigment Yellow 4, C. I. Pigment Yellow 81, C. I. Pigment Yellow 97, and C. I. Pigment Yellow 93; and inorganic pigments such as yellow iron oxide and yellow ocher. The magenta coloring pigment includes, for example, C. I. Pigment Red 49, C. I. Pigment Red 57, C. I. Pigment Red 81, C. I. Pigment Red 122, C. I. Pigment Red 184, and C. I. Pigment Red 238. The cyan coloring pigment includes, for example, C. I. Pigment Blue 15 and C. I. Pigment Blue 16. It is of course allowable that one of the coloring pigment as described above is used or two or more of the coloring pigments as described above are used in combination. The particle size of the coloring pigment is not specifically limited. However, in view of, for example, the dispersibility, the particle size of the coloring pigment is preferably not more than 0.2 μm. The content of the coloring pigment is preferably within a range of 0.1 to 20% by weight with respect to the ink, for the following reason. That is, if the content of the coloring pigment is less than 0.1% by weight, it is feared that the coloring power is insufficient. On the contrary, if the content of the coloring pigment is larger than 20% by weight, it is feared that the discharge port of the ink head is clogged. More preferably, the content of the coloring pigment is within a range of 0.5 to 10% by weight. The resin particles contained in the color ink are preferably acrylic resin particles, because the acrylic resin particles are stable in acidic pH area, particularly not more than 4.5 pH.

The acrylic resin particles to be used for the color ink are the resin particles containing the main component of polyacrylic acid or polyacrylic acid ester. The usable monomer includes, for example, (meth)acrylic acid and (meth)acrylic acid esters such as methyl(meth)acrylate, ethyl(meth)acrylate, propyl(meth)acrylate, isopropyl(meth)acrylate, butyl (meth)acrylate, isobutyl(meth)acrylate, t-butyl(meth)acrylate, pentyl(meth)acrylate, 2-ethylhexyl(meth)acrylate, octyl (meth)acrylate, cyclopropyl(meth)acrylate, cyclopentyl (meth)acrylate, cyclohexyl(meth)acrylate, cycloheptyl (meth)acrylate, cyclooctyl(meth)acrylate, phenyl(meth) acrylate, benzyl(meth)acrylate, tolyl(meth)acrylate, disilyl (meth)acrylate, and phenethyl(meth)acrylate.

In the present invention, as described above, it is important that pH of the color ink to be used is not more than 4.5, for the following reason. That is, if pH of the color ink is higher than 4.5, the resin particles contained in the black ink are not coagulated sufficiently when the black ink makes contact with the color ink. More preferably, pH of the color ink is not more than 2.7. In order to adjust pH to be within the range as described above, the second pH-adjusting agent is added to the color ink. The second pH-adjusting agent includes, for example, organic acids such as lactic acid, citric acid, and gluconic acid; and inorganic acids such as HCl and $H_2CO_3$. In particular, it is preferable to use the organic acid in view of the prevention of the clog-up of the nozzle caused by the deposition.

Those exemplarily referred to for the black ink can be also used as the water-soluble organic solvent and water to be used for the color ink.

Other than the above, if necessary, it is allowable that conventionally known ink components including, for example, dispersing agents, surfactants, viscosity-adjusting agents, surface tension-adjusting agents, and antiseptic/fungicidal agents are added to the black ink and the color ink within ranges in which the effect of the present invention is not deteriorated.

The black ink and the color ink to be used in the present invention can be prepared in accordance with conventionally known methods. For example, the pigment, the resin particles, the pH-adjusting agent, and the water-soluble organic solvent are introduced into water to effect the preliminary mixing, followed by performing the dispersing and the mixing by using a conventionally known dispersing machine including, for example, ball mill, attriter, sand-glider, three-roll mill, high speed impeller mill, jet mill, kneader, paint shaker, homogenizer, and ultrasonic dispersing machine to obtain the black ink or the color ink. The time required for the dispersing and the mixing is generally about 0.5 to 20 hours. Further, coarse particles may be removed after the dispersing and the mixing by using a centrifugal separator.

The ink set of the present invention includes the black ink and the color ink as explained above. One color ink or two or more color inks may be used. In order to obtain a full color image, it is desirable to use a combination of the black ink and the color inks of three colors of cyan, magenta, and yellow. It is a matter of course that no problem arises even when the color inks of, for example, white and metallic colors other than the above are used.

The ink set of the present invention can be used for conventionally known image-forming apparatuses based on the ink-jet system. The image formation with the black ink may be performed either before or after the image formation with the color ink. However, in order to avoid the bleeding of the black ink more effectively, it is preferable that the image formation with the black ink is performed after performing the image formation with the color ink. The image formation objective is not limited, which may include, for example cloths other than paper. The image, which is formed on the image formation objective, is heated and fixed by using a hot press or an oven. For example, the following heating condition is adopted. That is, the heating temperature is 150 to 200° C., and the heating time is 0.1 to 5 minutes.

EXAMPLES

The present invention will be explained more specifically below on the basis of Examples and Comparative Examples. However, the present invention is not limited thereto at all.

Preparation of Black Ink

Carbon black as a black pigment, resin particles having carboxyl group ("KZA-5034S" produced by UNITIKA LTD.), a first pH-adjusting agent (triethanolamine), a water-soluble organic solvent (glycerol), a dispersing agent (modified polyacrylic acid), a surfactant (acetylene glycol), and pure water were introduced in ratios shown in Table 1 into a dispersing machine respectively, followed by being dispersed and mixed with each other to prepare each of twelve types of black inks A to L. pH and the viscosity are also shown in Table 1 for the respective prepared black inks. The measurement of the viscosity was unsuccessful for the black inks K and L in each of which pH was not more than 5, because the inks were gelated.

TABLE 1

| Composition | Black ink | | | | | | | | | | | |
|---|---|---|---|---|---|---|---|---|---|---|---|---|
| | A | B | C | D | E | F | G | H | I | J | K | L |
| Pigment: carbon black | 5 | 5 | 5 | 5 | 5 | 5 | 5 | 5 | 5 | 5 | 5 | 5 |
| Dispersing agent: modified polyacrylic acid | 1 | 1 | 1 | 1 | 1 | 1 | 1 | 1 | 1 | 1 | 1 | 1 |
| Polyester resin particles: "KZA-5034S" produced by UNITIKA LTD. | 25 | 25 | 25 | 25 | 25 | 25 | 25 | 25 | 25 | 25 | 25 | 25 |
| Water-soluble organic solvent: glycerol | 15 | 20 | 22 | 24 | 24.5 | 24.9 | 25 | 24.9 | 24.8 | 24.7 | 24.5 | 20 |
| pH-adjusting agent triethanolamine | 10 | 5 | 3 | 1 | 0.5 | 0.1 | | | | | | |
| lactic acid | | | | | | | | 0.1 | 0.2 | 0.3 | 0.5 | 5 |
| Surfactant: acetylene glycol | 0.5 | 0.5 | 0.5 | 0.5 | 0.5 | 0.5 | 0.5 | 0.5 | 0.5 | 0.5 | 0.5 | 0.5 |
| Pure water | 43.5 | 43.5 | 43.5 | 43.5 | 43.5 | 43.5 | 43.5 | 43.5 | 43.5 | 43.5 | 43.5 | 43.5 |
| pH at 25° C. | 9.9 | 9.6 | 9.5 | 9.2 | 9.0 | 8.8 | 8.7 | 7.8 | 6.7 | 5.8 | 4.8 | 2.7 |
| Viscosity at 25° C. (mPa·S) | 6.3 | 6.0 | 5.6 | 5.6 | 5.7 | 5.5 | 5.5 | 6.4 | 4.6 | 4.5 | gel | gel |

Preparation of Yellow Ink

A yellow pigment (C. I. Pigment Yellow 17), an acrylic resin ("AT-191" produced by Showa Highpolymer), a second pH-adjusting agent (50% gluconic acid aqueous solution, lactic acid, or citric acid), a water-soluble organic solvent (glycerol), a dispersing agent (modified polyacrylic acid), a surfactant (acetylene glycol), and pure water were introduced in ratios shown in Table 2 into a dispersing machine respectively, followed by being dispersed and mixed with each other to prepare each of nine types of yellow inks I to IX. pH and the viscosity are also shown in Table 2 for the respective prepared yellow inks.

Examples 1 to 21 and Comparative Examples 1 to 6

The prepared black inks and yellow inks were combined as shown in Tables 3 to 5 to obtain ink sets each of which was installed to an image-forming apparatus based on the ink-jet system. An image was formed on a white shirt ("Hanes BEEFY-T" produced by Hanes) so that the black portion and the yellow portion were contacted with each other. After that, the inks were melted and fixed by using a hot press (180° C.×30 seconds). The boundary between the black portion and the yellow portion was visually observed to investigate whether or not any whisker-shaped bleeding of the black ink was present in the yellow area. The evaluation was made in accordance with the following criteria. Results are shown in

TABLE 2

| Composition | Yellow ink | | | | | | | | |
|---|---|---|---|---|---|---|---|---|---|
| | I | II | III | IV | V | VI | VII | VIII | IX |
| Pigment: C. I. Pigment Yellow 17 | 2.5 | 2.5 | 2.5 | 2.5 | 2.5 | 2.5 | 2.5 | 2.5 | 2.5 |
| Dispersing agent: modified polyacrylic acid | 2 | 2 | 2 | 2 | 2 | 2 | 2 | 2 | 2 |
| Acrylic resin particles: "AT-191" produced by Showa Highpolymer | 10 | 10 | 10 | 10 | 10 | 10 | 10 | 10 | 10 |
| Water-soluble organic solvent: glycerol | 25 | 25 | 25 | 25 | 25 | 25 | 25 | 25 | 25 |
| pH-adjusting agent lactic acid | 0 | 0.5 | 1 | 5 | 10 | | | | |
| citric acid | | | | | | 2 | 1 | | |
| 50% gluconic acid | | | | | | | | 5 | 1 |
| Surfactant: acetylene glycol | 0.5 | 0.5 | 0.5 | 0.5 | 0.5 | 0.5 | 0.5 | 0.5 | 0.5 |
| Pure water | 60 | 59.5 | 59 | 55 | 50 | 58 | 59 | 55 | 59 |
| pH at 25° C. | 7.9 | 2.6 | 2.4 | 2.0 | 1.9 | 2.6 | 2.7 | 4.4 | 4.6 |
| Viscosity at 25° C. (mPa·S) | 5-7 | 5-7 | 5-7 | 5-7 | 5-7 | 4-6 | 4-6 | 4-6 | 4-6 |

Tables 3 to 5. "VG" (very good): the bleeding of the black ink was absent, and the boundary portion was vividly divided. "OK": the boundary portion was blurred. "NG": the whisker-shaped bleeding of the black ink was present.

TABLE 3

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| Black ink | A | F | H | A | F | H | A | F | H | A | F | H |
| Yellow ink | II | ← | ← | III | ← | ← | IV | ← | ← | V | ← | ← |
| Bleeding | OK | OK | OK | OK | OK | VG | VG | VG | VG | VG | VG | VG |

TABLE 4

|  | Ex.13 | Ex.14 | Ex.15 | Ex.16 | Ex.17 | Ex.18 | Ex.19 | Ex.20 | Ex.21 |
|---|---|---|---|---|---|---|---|---|---|
| Black ink | A | F | H | A | F | H | A | F | H |
| Yellow ink | VI | ← | ← | VII | ← | ← | VIII | ← | ← |
| Bleeding | VG | VG | VG | VG | VG | VG | VG | VG | VG |

TABLE 5

|  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Black ink | A | F | H | A | F | H |
| Yellow ink | I | ← | ← | IX | ← | ← |
| Bleeding | NG | NG | NG | NG | NG | NG |

As clarified from Tables 3 to 5, the whisker-shaped bleeding of the black ink was not caused in the ink sets of Examples 1 to 21. On the contrary, the whisker-shaped bleeding of the black ink was caused in every one of the ink sets of Comparative Examples 1 to 3 in which the yellow ink I having pH of 7.9 was used and the ink sets of Comparative Examples 4 to 6 in which the yellow ink IX having pH of 4.6 was used.

Comparative Example 7

A black ink and a yellow ink composed of the following compositions were prepared in the same manner as described above to obtain an ink set.

Black Ink
   Carbon black: 5% by weight;
   Water-soluble organic solvent (glycerol): 50% by weight;
   Dispersing agent (modified polyacrylic acid): 1% by weight;
   Surfactant (acetylene glycol): 0.5% by weight;
   Pure water: 43.5% by weight.

Yellow Ink
   Yellow pigment (C. I. Pigment Yellow 17): 2.5% by weight;
   Water-soluble organic solvent (glycerol): 50% by weight;
   Dispersing agent (modified polyacrylic acid): 2% by weight;
   Surfactant (acetylene glycol): 0.5% by weight;
   Pure water: 45% by weight.

Evaluation of Washing Durability

A pretreatment solution having the following composition was sprayed onto a white shirt as described above, and then an image was formed with the image-forming apparatus described above by using the ink set of Comparative Example 7. The shirt was introduced into a washing machine to perform a rinsing treatment for 30 minutes.

Pretreatment Solution
   Pure water: 85% by weight;
   Ethanol: 10% by weight;
   High molecular weight coagulating agent ("Catiomer 300" produced by Sanyo Chemical Industries, Ltd.): 5% by weight.

The shirt, on which the image was formed by using the ink set of Example 7, was introduced into the washing machine, and the rinsing treatment was performed for 30 minutes in the same manner as described above. In relation to the ink sets of Example 7 and Comparative Example 7, visual observation was performed to investigate whether or not the whisker-shaped bleeding of the black ink was present in the yellow area at the boundary between the black portion and the yellow portion. Further, the density was measured for the black portion before and after the rinsing treatment. Results are shown in Table 6.

TABLE 6

|  |  | Black density | |
|---|---|---|---|
|  | Bleeding | before rinsing | after rinsing |
| Example 7 | absent | 1.3 | 1.2 |
| Comparative Example 7 | occurred a little | 1.3 | 1.0 |

As clarified from Table 6, the bleeding of the black ink was not caused on the image formed with the ink set of Example 7, and the decrease in density of the black portion was 0.1 between before and after the rinsing treatment. On the contrary, the bleeding of the black ink was slightly caused on the image formed with the ink set of Comparative Example 7, and the density of the black portion after the rinsing treatment was decreased by as much as 0.3 as compared with the density before the rinsing treatment.

An embodiment of an ink cartridge which contains the ink set in accordance with the invention is shown in FIG. 1. The ink cartridge 22 has four compartments 22b, 22c, 22m, 22y which contain the black ink, cyan ink, magenta ink and yellow ink as prepared in the above examples, respectively. The compartment 22b, 22c, 22m, 22y may be formed integrally or independently. The ink cartridge 22 is removably installed on an ink jet head 18. The ink jet head 18 has nozzle heads 21b, 21c, 21m, 21y which communicate with the compartment 22b, 22c, 22m, 22y to eject the black ink, cyan ink, magenta ink and yellow ink, respectively. A plurality of nozzles 24 are formed on the surface 23 of each nozzle head. The ink jet head is typically mounted on a carriage 17 which moves on and along a surface of a recording sheet. The ink cartridge may be placed independent from the ink jet head. For example, the ink cartridge may be provided on the ink jet printer frame and be connected with the ink jet head by a flexible tube through which the ink is passed.

In the ink set of the present invention, the ink, which contains the black pigment, the resin particles having the carboxyl group, the first pH-adjusting agent, the water-soluble organic solvent, and water and which has pH of not less than 7.8, is used as the black ink. Further, the ink, which contains the coloring pigment, the resin particles, the second pH-adjusting agent, the water-soluble organic solvent, and water and which has pH of not more than 4.5, is used as the color ink other than the black ink. Therefore, even when an image is formed on a cloth or the like, the bleeding of the pigment-based black ink is not caused. Further, even when an image formation objective such as a cloth or the like is washed, then the ink is not lost from the image formation objective, and the initial image density is maintained.

What is claimed is:

1. A color ink set comprising a black ink and a color ink that is different from the black ink, wherein:

the black ink comprises a black pigment, resin particles having carboxyl groups, a first pH-adjusting agent, a first water-soluble organic solvent, a first dispersing agent, and water, the resin particles comprising at least one member selected from the group consisting of polyester resin particles, polyurethane resin particles, and polyolefin resin particles, the resin particles contained in the black ink being formed of a binding resin;

the color ink comprises a coloring pigment, resin particles, a second pH-adjusting agent, a second water-soluble organic solvent, a second dispersing agent, and water;

the resin particles contained in the color ink are different than the resin particles contained in the black ink and are acrylic resin particles; and a pH of the black ink is not less than 7.8, and a pH of the color ink is not more than 4.5.

2. The color ink set according to claim 1, wherein the pH of the black ink is not less than 8.7.

3. The color ink set according to claim 2, wherein the pH of the color ink is not more than 2.7.

4. The color ink set according to claim 1, wherein the first pH-adjusting agent is an organic amine.

5. The color ink set according to claim 1, wherein the second pH-adjusting agent is an organic acid.

6. The color ink set according to claim 1, wherein the acrylic resin particles comprise at least one member selected from the group consisting of an acrylic acid and an acrylic acid ester.

7. An ink cartridge comprising the color ink set according to claim 1.

8. The color ink set according to claim 1, wherein the binding resin adheres to a fabric by melting.

* * * * *